US006741907B2

(12) United States Patent
Chaloner (10) Patent No.: US 6,741,907 B2
(45) Date of Patent: May 25, 2004

(54) INVENTORY CONTROL APPARATUS AND METHOD FOR A DATA STORAGE SYSTEM

(75) Inventor: Michael J. Chaloner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/815,890

(22) Filed: Mar. 23, 2001

(65) Prior Publication Data

US 2002/0138174 A1 Sep. 26, 2002

(51) Int. Cl.⁷ .................................................. G07F 7/00
(52) U.S. Cl. ...................... 700/214; 700/218; 700/214; 700/216
(58) Field of Search ................................ 700/214, 217, 700/216

(56) References Cited

U.S. PATENT DOCUMENTS

| | | | |
|---|---|---|---|
| 3,666,337 A | 5/1972 | Sztorc | 312/111 |
| 4,993,784 A | 2/1991 | Dana et al. | 312/221 |
| 5,001,582 A | 3/1991 | Numasaki | 360/98.06 |
| 5,036,503 A | 7/1991 | Tomita | 369/36 |
| 5,060,211 A | 10/1991 | Blanding | 369/36 |
| 5,067,116 A * | 11/1991 | Kadrmas | 369/37 |
| 5,236,258 A * | 8/1993 | Bunch | 312/9.31 |
| 5,255,251 A | 10/1993 | Fitzgerald et al. | 369/36 |
| 5,544,146 A | 8/1996 | Luffel et al. | 369/178 |
| 5,546,315 A * | 8/1996 | Kleinschnitz | 364/478.06 |
| 5,644,445 A | 7/1997 | Ishikawa | 360/71 |
| 5,652,742 A * | 7/1997 | Baca et al. | 369/34 |
| 5,659,440 A | 8/1997 | Acosta et al. | 360/92 |
| 5,682,096 A | 10/1997 | Christie, Jr. et al. | 324/207.2 |
| 5,860,717 A | 1/1999 | Mizrahi | 312/322 |
| 5,940,354 A | 8/1999 | Inoue | 369/35 |
| 5,999,356 A | 12/1999 | Dimitri et al. | 360/71 |
| 6,023,643 A | 2/2000 | Jesionowski | |
| 6,025,972 A | 2/2000 | Schmidtke et al. | 360/98.06 |
| 6,038,099 A | 3/2000 | Heinze et al. | 360/92 |
| 6,160,786 A | 12/2000 | Coffin et al. | 369/178 |

FOREIGN PATENT DOCUMENTS

DE        3511161 A1    3/1985
WO        WO85/02051   5/1985

OTHER PUBLICATIONS

U.S. patent application Ser. No. 09/179,793, filed Oct. 27, 1998, for "Mail Slot Datga Cartridge Exchange System for Use with a Data Storage System" of Nicholas D. Thayer, et al.
U.S. patent application Ser. No. 09/257,322, filed Feb. 25, 1999, "Data Cartridge Import/Export Drawer Having Three–Element, Two Configuration Slide" of Mueller, et al.

* cited by examiner

Primary Examiner—Donald P. Walsh
Assistant Examiner—Michael E Butler (57) ABSTRACT

Inventory control apparatus for a data storage system may comprise a first setting and a second setting. The first setting causes the data storage system to inventory a data cartridge storage location of the data storage system after the data storage system has undergone a power cycle. The second setting causes the data storage system to not perform an inventory after the data storage system has undergone the power cycle.

13 Claims, 9 Drawing Sheets

INVENTORY CONTROL APPARATUS AND METHOD FOR A DATA STORAGE SYSTEM

FIELD OF INVENTION

This invention relates to data storage systems in general, and more specifically to an inventory control apparatus and method for use in a data storage system.

BACKGROUND

Many different types of data storage systems or libraries exist and are being used to store data cartridges at known locations and to retrieve those data cartridges from the storage locations so that data may be written to or read from those data cartridges. Such data storage systems are typically used to store magnetic data cartridges for long term archival purposes or for short term back-up system purposes. However, other types of data storage devices comprising virtually any type of data storage medium could also be stored within the data storage systems.

A typical data storage system may include one or more different types of cartridge receiving devices for holding the various data cartridges. For example, one type of cartridge receiving device may comprise a cartridge storage rack or "magazine." The cartridge storage racks or magazines usually include cartridge storage slots which serve as storage locations for the data cartridges. The various cartridge storage racks or magazines of the data storage system may be positioned within magazine drawers which are commonly arranged so that they form one or more horizontal stacks. Alternatively, the magazine drawers may be arranged so that they form one or more vertical stacks. Another type of cartridge receiving device may comprise a cartridge read/write device. The cartridge read/write device may be located adjacent a cartridge magazine, although the cartridge read/write device may be positioned at any convenient location.

The data storage system may also be provided with a cartridge handling system for transporting the data cartridges between the various cartridge receiving devices, e.g., between the cartridge storage racks and the cartridge read/write devices. A typical cartridge handling system may include a cartridge access device for accessing the various data cartridges contained in the cartridge receiving devices, as well as a positioning system for moving the cartridge access device among the various cartridge receiving devices contained in the data storage system.

Since the contents of the data storage systems and/or the arrangement of the data cartridges therein may be periodically changed, most data storage systems are provided with an inventory system. The inventory system may be used for keeping track of the presence, locations and identities of the various data cartridges within the data storage system. Typically, the inventory system is internal to the data storage system, although such need not be the case.

The inventory system may include a bar code reading device or other device for identifying data cartridges. More specifically, each of the various data cartridges stored within the data storage system may be provided with a bar code label having data encoded thereon that identifies the data cartridge on which it is placed. The bar code reading device may be used to read the data on the bar code labels to keep track (i.e., inventory) of the presence, locations and identities of the various data cartridges within the data storage system. For example, the bar code reading device may be moved among the various cartridge receiving devices and read the bar codes on the cartridges within those cartridge receiving devices so that their identities and respective locations may be obtained. This information may then be compiled or stored in an "inventory list" which the data storage system may later access to locate a particular data cartridge.

Data storage systems of the type described above are usually connected to a host computer system which may access or store data on the data cartridges. For example, if certain data contained on a particular data cartridge is desired, the host computer system will issue commands to a control system associated with the data storage system. In response to those commands, the control system will actuate the positioning system which moves the cartridge access device along the cartridge storage racks or magazines until the cartridge access device is positioned adjacent to where the desired data cartridge should be located according to the inventory list. The bar code reading device may assist the control system in determining when the cartridge access device has been positioned adjacent the desired data cartridge. In other words, the bar code reading device reads the bar code label positioned on the data cartridge to verify whether the data cartridge is the desired data cartridge. If not, the cartridge access device may be moved to another data cartridge. After the desired data cartridge has been located, the cartridge access device may then remove the desired cartridge from the cartridge storage rack and carry it to the cartridge read/write device. Once properly positioned adjacent the cartridge read/write device, the cartridge access device may insert the selected data cartridge into the cartridge read/write device so that the host computer may thereafter read data from or write data to the selected data cartridge. After the read/write operation is complete, the cartridge access device may remove the data cartridge from the cartridge read/write device and return it to its appropriate location in the cartridge storage rack.

It is often necessary or desirable for a system operator to periodically access one or more of the data cartridges contained within such a data storage system. For example, it may be necessary for the system operator to remove certain of the data cartridges from time to time if they become filled with data that is to be archived at another location. The system operator may then replace the filled data cartridges with blank or empty data cartridges. In another situation, the system operator may desire to remove one or more of the data cartridges and replace it or them with a substitute data cartridge or cartridges containing different data.

In order to accommodate the foregoing needs, many data storage systems are provided with extendable drawers that can be manually pulled open by the system operator to allow the system operator to access the data cartridges stored in the data storage systems. Such extendable drawers are typically locked in their closed positions only when the data storage system is operational. That is, the drawers may be opened by the system operator if the data storage system is shut down whether intentionally or unintentionally (e.g., a power failure). Since the system operator could have exchanged, removed, or added a data cartridge within a drawer while the data storage system was shut down, the data storage system must inventory each drawer when rebooted.

Considering the large number of data cartridges that may be stored within a data storage system, the time needed for the inventory can be quite substantial. Such a time-consuming process is difficult to justify, especially if the data cartridges within the data storage system were not changed.

The time-consuming inventories can be especially troublesome for system operators and support engineers who often must service the data storage system (e.g., for a firmware upgrade) according to stringent time deadlines. Typically, the data storage system must be shut down before any changes (e.g., circuit board replacement) can be made thereto. Thus, even though the system operator may be under stringent deadlines, the astute system operator will need to set aside sufficient time to allow the data storage system to reboot and inventory its data cartridges. In actuality, however, the system operator normally reboots the data storage system more than once and will lose a considerable amount of time while waiting for the inventory process to be completed.

SUMMARY OF THE INVENTION

Accordingly, a need remains for a data storage system that allows a system operator to reboot the data storage system without an inventory. Ideally, the system operator should be able to select whether the data storage system will perform an inventory when rebooted, and select which data cartridge storage locations, if any, will be inventoried.

Inventory control apparatus for a data storage system may comprise a first setting and a second setting. The first setting causes the data storage system to inventory a data cartridge storage location of the data storage system after the data storage system has undergone a power cycle. The second setting causes the data storage system to not perform an inventory after the data storage system has undergone the power cycle.

Also disclosed is an inventory control method for use in a data storage system that comprises the steps of: providing inventory control apparatus operatively associated with the data storage system, the inventory control apparatus being operable in a first setting and a second setting, the first setting causing the data storage system to inventory a data cartridge storage location of the data storage system after the data storage system has undergone a power cycle, the second setting causing the data storage system to not perform an inventory after the data storage system has undergone the power cycle; selecting the first setting so that said data storage system inventories the data cartridge storage location after said data storage system has undergone the power cycle, or, in the alternative; selecting the second setting so that said data storage system does not perform an inventory after said data storage system has undergone the power cycle.

BRIEF DESCRIPTION OF THE DRAWINGS

Illustrative and presently preferred embodiments of the invention are shown in the accompanying drawing in which.

DETAILED DESCRIPTION OF THE INVENTION

Figure 1:
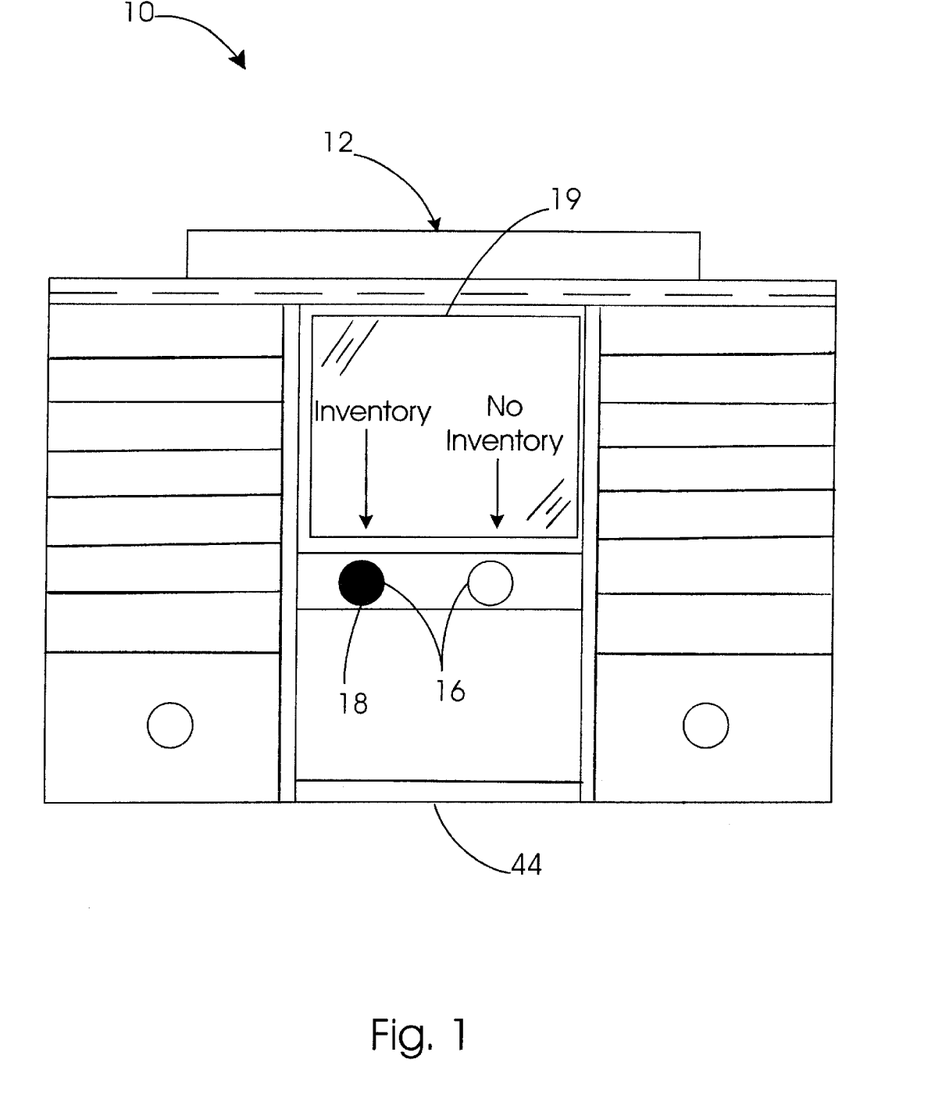
FIG. 1 is a front view in elevation of a data storage system in which may be used the inventory control apparatus according to one embodiment of the present invention.
Figure 2:
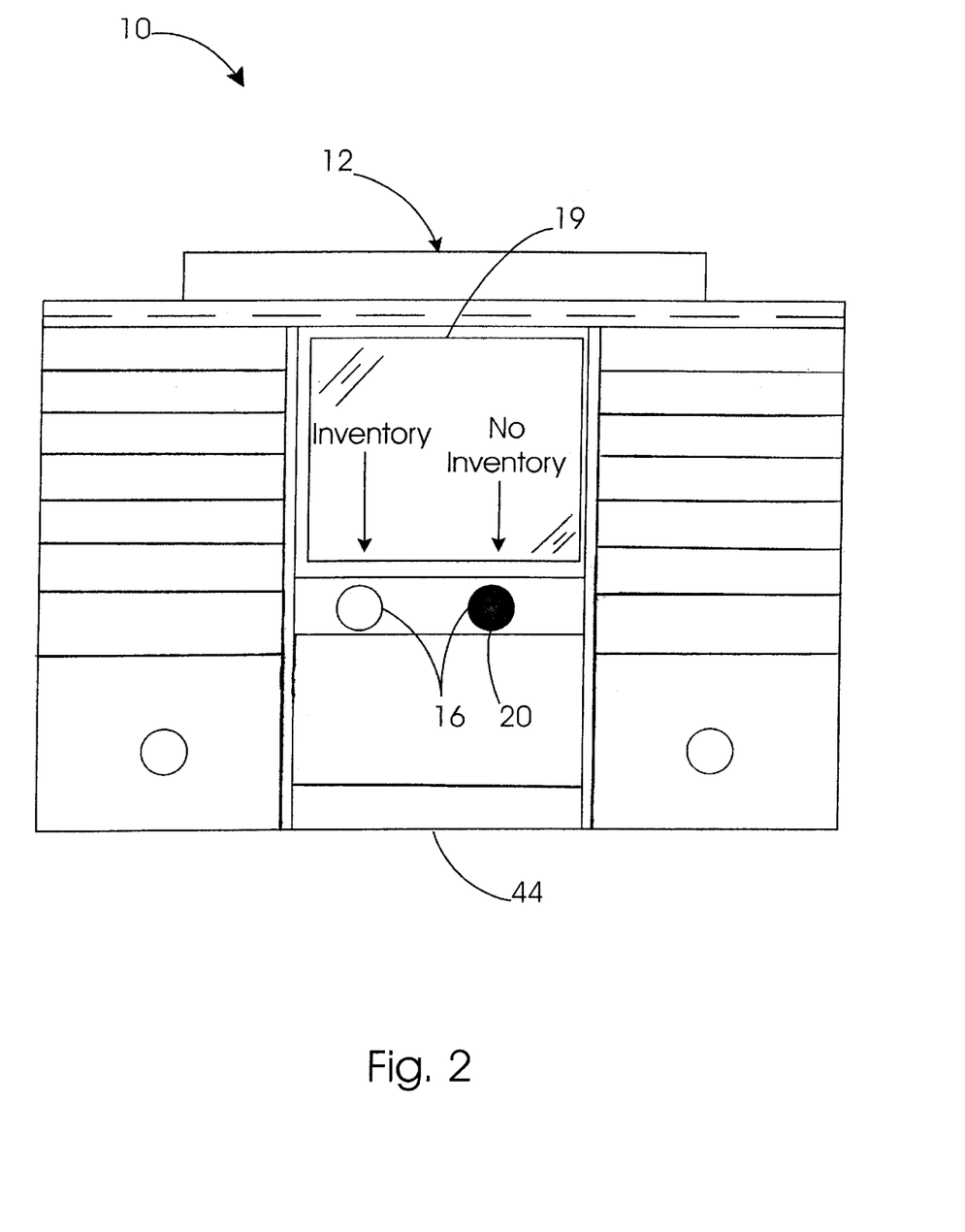
FIG. 2 is another front view in elevation of the data storage system shown in FIG. 1 with the inventory control apparatus in a second or no inventory setting.
Figure 3:
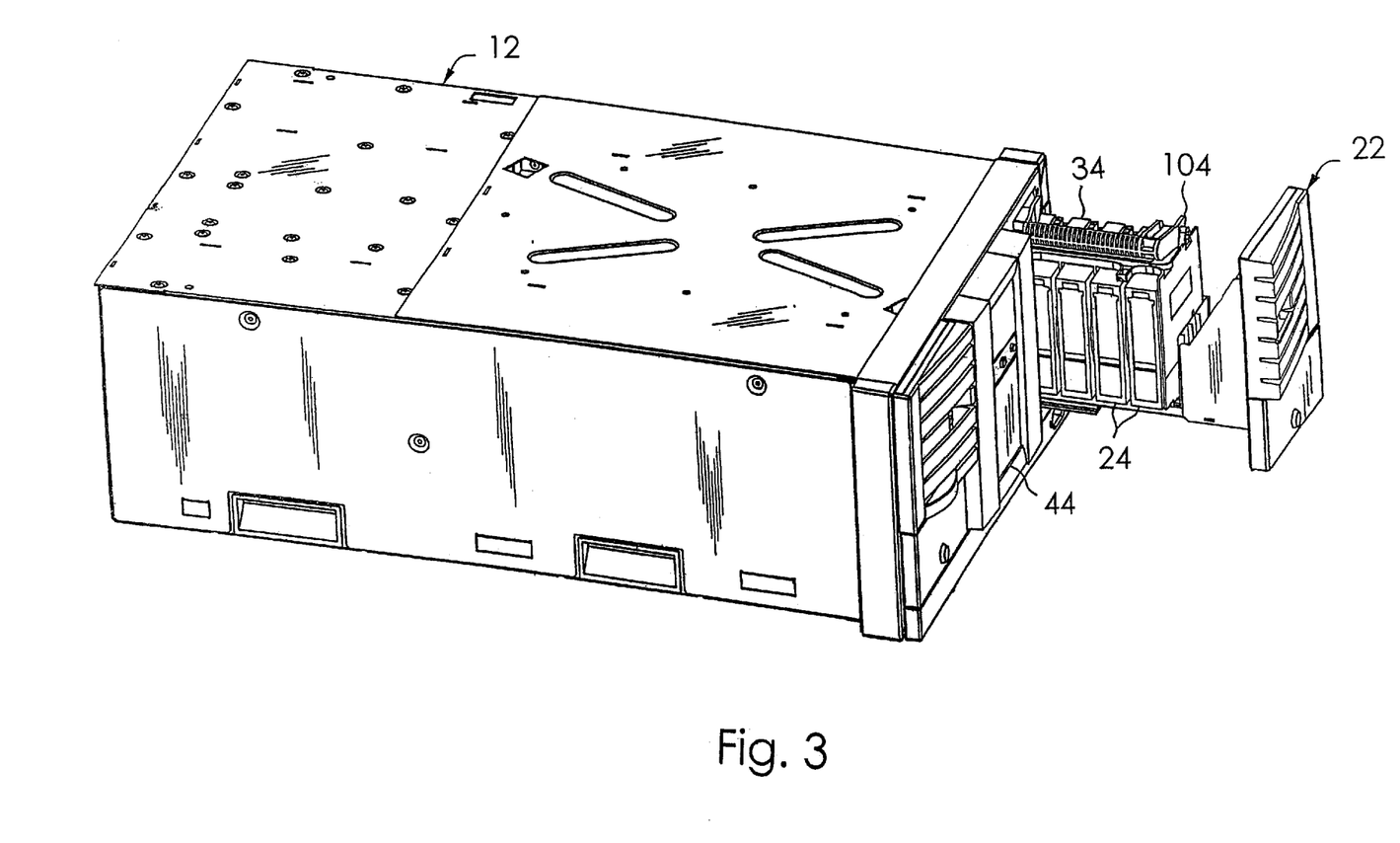
FIG. 3 is a plan view of the data storage system shown in FIG. 1.

An inventory control apparatus 10 according to one preferred embodiment of the present invention is shown in FIGS. 1 and 2 and described herein as it could be used in conjunction with a data storage system or library 12 (shown more fully in FIG. 3). The inventory control apparatus 10 allows a system operator (not shown) to choose whether or not the data storage system 12 will inventory any of its data cartridge storage locations, such as the data cartridge storage locations within drawer 22, after the data storage system 12 undergoes a power cycle (e.g., after the data storage system 12 has been shut down and then rebooted). For example, the system operator may need to shut down the data storage system 12 in order to service the data storage system 12. By providing the system operator with the choice of rebooting the data storage system 12 without an inventory, the inventory control apparatus 10 can save the system operator a significant amount of time.

With reference now primarily to FIGS. 1 and 2, the inventory control apparatus 10 utilized in one preferred embodiment may comprise a switch 16 that allows a system operator to select between a first setting 18 (FIG. 1) and a second setting 20 (FIG. 2). The first setting 18 may cause the data storage system 12 to inventory all of its data cartridge storage locations after the data storage system 12 has undergone a power cycle. As will be explained later, however, the inventory control apparatus 10 may also be operable in one or more other settings each of which causes the data storage system 12 to inventory a particular portion of, but not all, of the data cartridge storage locations contained within the data storage system 12 (e.g., only the data cartridges 24 and empty storage slots contained within drawer 22).

The first setting 18 may be preserved over one or more power cycles of the data storage system 12 until changed by the system operator. In other words, the first setting 18 may be preserved for subsequent power cycles of the data storage system 12.

The first setting 18 may also cause the data storage system 12 to modify an inventory list (not shown), if necessary, in accordance with the results of the inventory. In other words, if the contents and/or data cartridge arrangement of the data storage system 12 has been changed (e.g., if a data cartridge 24 has been moved, added, removed, or replaced), the changes are incorporated into the inventory list. That is, the data storage system 12 modifies or alters the inventory list so that the inventory list comprises data representative of the data cartridge storage locations (e.g., presence, locations and identities of data cartridges 24 therein) within the data storage system 12 after the power cycle. The data storage system 12 may then use the modified inventory list to locate one or more data cartridge 24.

Referring now to FIG. 2, the inventory control apparatus 10 may also be operable in the second setting 20. When operated in the second setting 20, the inventory control apparatus 10 causes the data storage system 12 to not perform an inventory after the data storage system 12 has undergone a power cycle. For example, if the system operator powers down and then reboots the data storage system 12, the data storage system 12 will not inventory any of its data cartridge storage locations if the inventory control apparatus 10 is in the second setting 20. The data storage system 12 will instead use the inventory list that was created prior to the power cycle to locate a data cartridge 24 contained within the data storage system 12.

It is generally preferred, but not required, that the inventory control apparatus 10 be changed from the second setting 20 to the first setting 18 without any system operator intervention after the data storage system 12 has been rebooted without an inventory. It is also preferable, however, to provide the system operator with the option of having the second setting 20 preserved over one or more power cycles of the data storage system 12 until changed by the system operator, although such is not required.

As discussed above, in one preferred embodiment of the inventory control apparatus 10, a switch 16 may be used to allow the system operator to select between the first and second settings 18 and 20. As will be explained in greater detail below, the system operator may be able to make this selection before the data storage system 12 is shut down, while the data storage system 12 is shut down or rebooting, or even as late as after the data storage system 12 has been rebooted. The switch 16 may be operatively associated with a control panel 44 of the data storage system 12. More specifically, the control panel 44 may be provided with push buttons 16 that the system operator accesses or pushes to select between the first and second settings 18 and 20. See FIGS. 1 and 2. The control panel 44 may also include a means for identifying the first and second settings 18 and 20. For example, in the embodiment shown and described herein, the control panel 44 is provided with a display screen 19 that identifies which of the buttons 16 corresponds to the first (i.e., inventory) setting 18 and which of the buttons 16 corresponds to the second (i.e., no inventory) setting 20. Alternatively, and as will be explained in greater detail below, other arrangements are possible.

The inventory control apparatus 10 may further include a lock assembly or apparatus 46 (FIG. 9) operatively associated with the drawer 22 of the data storage system 12. In the embodiment shown and described herein, the lock assembly 46 is used to secure the drawer 22 in a fully closed or retracted position thereby securing the data cartridges 24 and data cartridge storage locations of drawer 22 inside the data storage system 12. The lock assembly 46 may be operatively associated with the inventory control apparatus 10 such that when the second (i.e., no inventory) option 20 is selected the lock assembly 46 secures or locks the drawer 22 in the closed position. With the drawer 22 securely closed, the system operator will not be able to access any of the data cartridges 24 or data cartridge storage locations within the drawer 22.

Figure 4:
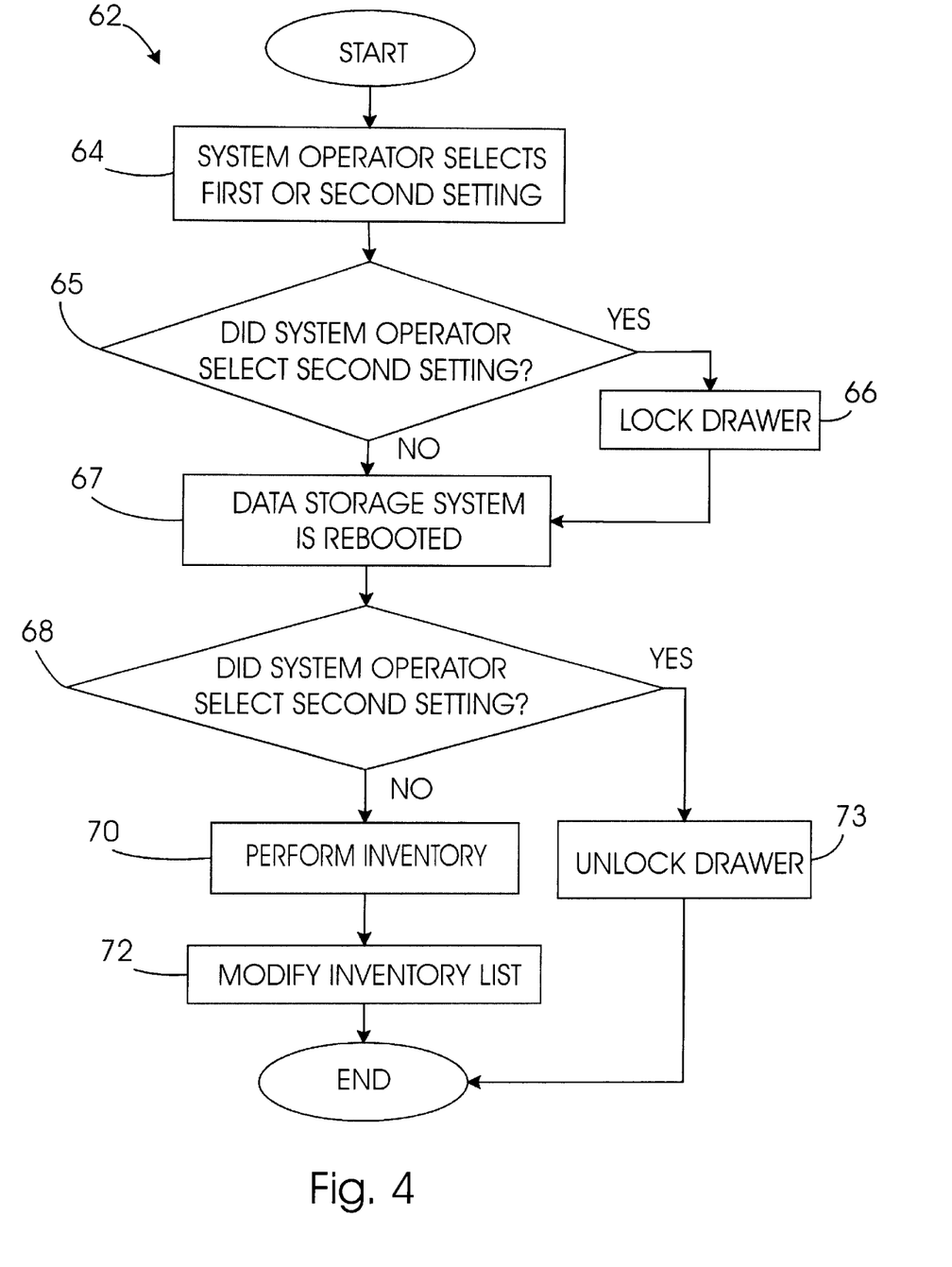
FIG. 4 is a flowchart representation of an inventory control method according to one embodiment of the present invention.

The inventory control apparatus 10 may be operated in accordance with a method 62 illustrated in FIG. 4 to allow the system operator to choose whether or not the data storage system 12 will inventory any of its data cartridge storage locations, such as the data cartridge storage locations within drawer 22, after the data storage system 12 undergoes a power cycle. In the first step 64 of method 62, the system operator selects or changes the setting 18 or 20 of the inventory control apparatus 10. For example, if the system operator wants the data storage system 12 to perform an inventory when the data storage system 12 is rebooted, the system operator would select the first setting 18 by pushing the appropriate button 16 on the control panel 44 of the data storage system 12. See FIG. 1. Conversely, if the system operator wanted to reboot the data storage system 12 without an inventory, the system operator would select the second setting 20 by pushing the other button 16 on the control panel 44. See FIG. 2. In the second step 65, a determination is made as to whether the system operator selected the second setting 20. If it is determined that the system operator did select the second setting 20, the drawer 22 may be locked in the fully closed position by the lock assembly 46 at step 66 so that the system operator is prevented from accessing the data cartridges 24 or data cartridge storage locations within the drawer 22. In the next step 67, the data storage system 12 undergoes the power cycle (e.g., the data storage system 12 is rebooted). If the data storage system 12 is powered down during the power cycle, the lock assembly 46 may release the drawer 22 while the data storage system 12 is without power and may then relock the drawer 22 once power is restored to the data storage system 12. At step 68, a determination is again made as to whether the system operator selected the second setting 20. If it is determined that the system operator did not select the second setting 20 (e.g., the system operator selected the first setting 18), the data storage system 12 performs an inventory at step 70 and then modifies the inventory list at step 72, if necessary (i.e., if the contents and/or data cartridge arrangement of the data storage system 12 has changed), in accordance with the results of the inventory. However, if it is determined that the system operator did select the second setting 20, the drawer 22 may be unlocked at step 73 but the data storage system 12 will not perform an inventory.

A significant advantage of the present invention is that the inventory control apparatus 10 allows the system operator to choose whether or not an inventory will be performed after the data storage system 12 undergoes a power cycle (e.g., after the data storage system 12 is rebooted). By providing the system operator with the choice of rebooting the data storage system 12 without an inventory, the inventory control apparatus 10 can significantly reduce the time needed to reboot and return the data storage system 12 to service.

Another significant advantage of the present invention is that the settings (e.g., first and second settings 18 and 20) may be preserved until reset by the system operator. Yet another significant advantage is that the system operator may make the selection between the first and second settings 18 and 20 before the data storage system 12 is shut down, while the data storage system 12 is shut down or rebooting, or even as late as after the data storage system 12 has been rebooted.

Having briefly described the inventory control apparatus 10, as well as some of its more significant features and advantages, the various embodiments of the inventory control apparatus according to the present invention will now be described in detail. However, before proceeding with the description, it should be noted that the inventory control apparatus 10 according to the present invention may be utilized in any of a wide range of data storage systems now known or that may be developed in the future for storing and accessing one or more data cartridges therein. Accordingly, the present invention should not be regarded as limited to the particular data storage system 12 shown and described herein. It should also be noted that while the inventory control apparatus 10 is shown and described herein as it could be used in conjunction with magnetic data cartridges 24 having a standard size and configuration (e.g., digital linear tape or "DLT" cartridges), it is not limited to any particular type or style of data cartridge. Indeed, the inventory control apparatus 10 according to the present invention could be used with any type of data storage device comprising any type of data storage medium now known or that may be developed in the future. Consequently, the present invention should not be regarded as limited to use with the particular type and style of data cartridge 24 shown and described herein.

The data storage system 12 in which the inventory control apparatus 10 may be used may comprise any of a wide range of data storage systems now known in the art or that may be developed in the future for storing and accessing one or more data cartridges. By way of example only, the data storage system 12 may comprise a data storage system of the type shown and described in U.S. Pat. No. 6,025,972 for "MULTI-PLANE TRANSLATING CARTRIDGE HANDLING SYSTEM" of Schmidtke, which is incorporated herein by reference for all that it discloses. Even though data storage systems themselves are well-known in the art, a brief description of the data storage system 12 will be given in order to provide a more complete understanding of one environment in which may be used the inventory control apparatus 10.

Figure 5:
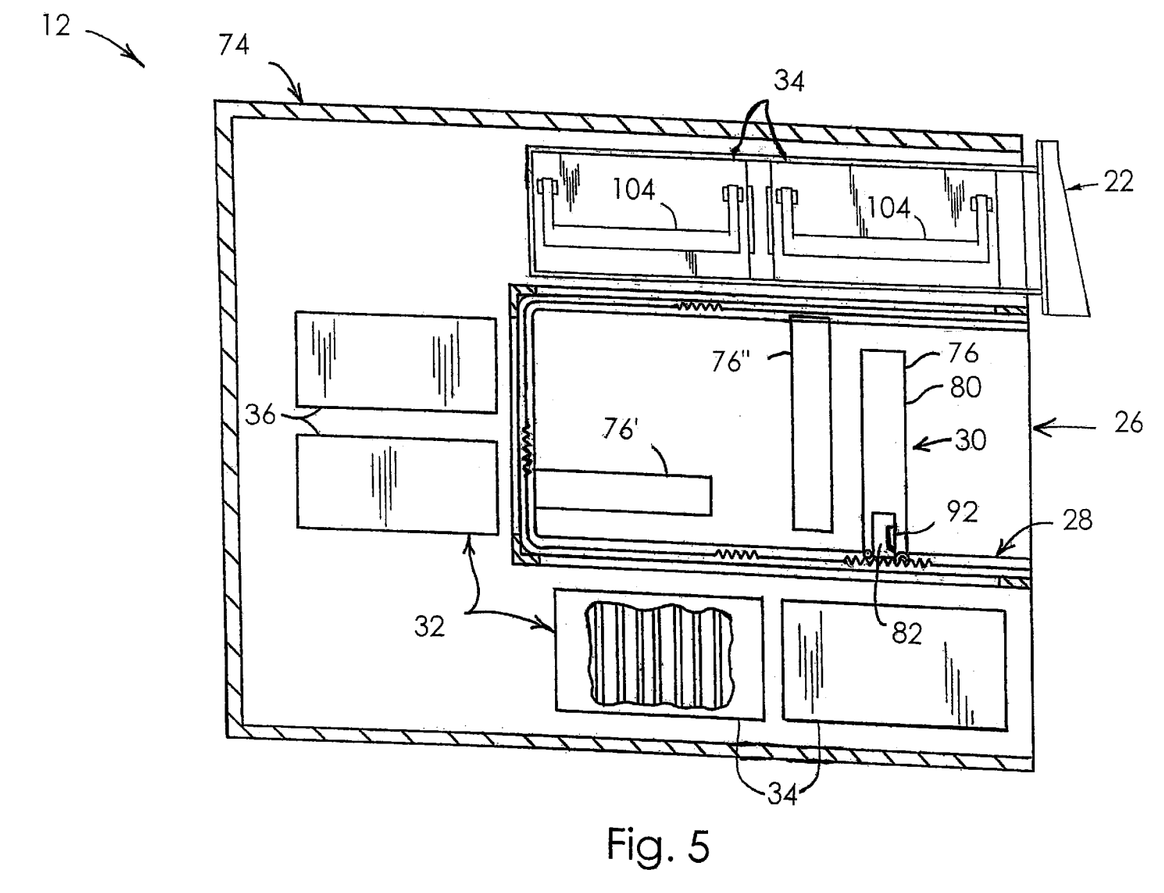
FIG. 5 is a plan view of the data storage system shown in FIG. 1 illustrating the cartridge handling system used to access the data cartridges and the internal arrangements of the various cartridge receiving devices.

Referring now primarily to FIG. 5, the data storage system 12 may comprise a main housing or chassis 74 configured to hold the various components of the data storage system 12. The housing 74 may comprise a generally rectangularly shaped structure adapted to receive the drawer 22, one or more cartridge receiving devices 32, and the cartridge handling system 26, which includes the cartridge access device 30 and the cartridge positioning system 28. The housing 74 may also be adapted to receive any of a wide range of other components or devices (e.g., control systems, inventory systems, power supplies, etc.) well-known in the art and that may be required for the operation of the data storage system 12.

Before proceeding with the description, it should be noted that the data storage system 12 may be provided with any convenient number of drawers 22 for storing and accessing the data cartridges 24. For example, in the embodiment shown and described herein, the data storage system 12 is provided with a single drawer 22. Alternatively, the data storage system 12 may be provided with a second drawer (not shown). However, the knowledge of the number of drawers that may be provided to a particular data storage system 12 is not required to understand and practice the present invention. Consequently, the remainder of the description will be directed to a data storage system 12 having only a single drawer 22.

It should also be noted that although the data cartridges 24 are shown and described herein as being contained within cartridge magazines 34, two of which are positioned within drawer 22 and provided with handles 104 to allow for convenient carrying, other arrangements are possible. For example, the drawer 22 could be configured to directly receive one or more data cartridges 24 (i.e., without the need for a separate cartridge magazine 34). In still another configuration, the drawer 22 could comprise a hybrid arrangement, with certain areas of the drawer 22 being configured to directly receive individual data cartridges 24 and with other areas of the drawer 22 being sized to receive a cartridge magazine or magazines 34. Consequently, the present invention should not be regarded as limited to use only with data cartridges 24 that are positioned within cartridge magazines 34.

Continuing now with the description, the cartridge handling system 26 of the data storage system 12 may be used to transfer data cartridges 24 between one or more of the cartridge receiving devices 32, such as one or more cartridge magazines 34 and one or more cartridge read/write devices 36. The various cartridge receiving devices 32 may be positioned at various locations within the data storage system 12 so that they define a generally U-shaped configuration, although other configurations are possible. The cartridge handling system 26 may comprise a cartridge access device 30 for accessing the various data cartridges 24 contained in the cartridge receiving devices 32. A cartridge positioning system 28 may also be provided for moving the cartridge access device 30 among the various cartridge receiving devices 32 contained in the data storage system 12.

Figure 6:
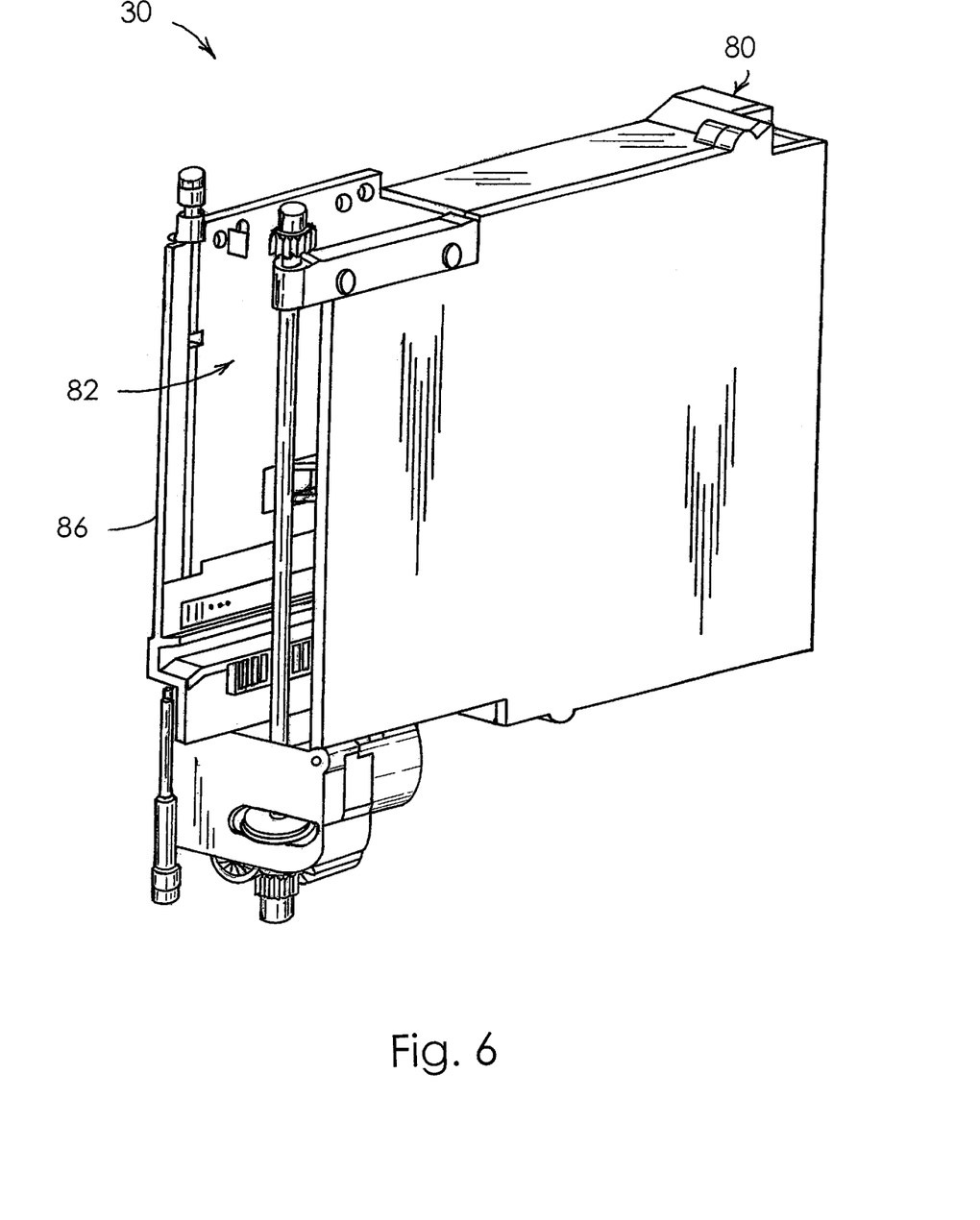
FIG. 6 is a perspective view of a cartridge access device that may be used in the data storage system shown in FIG. 1.
Figure 7:
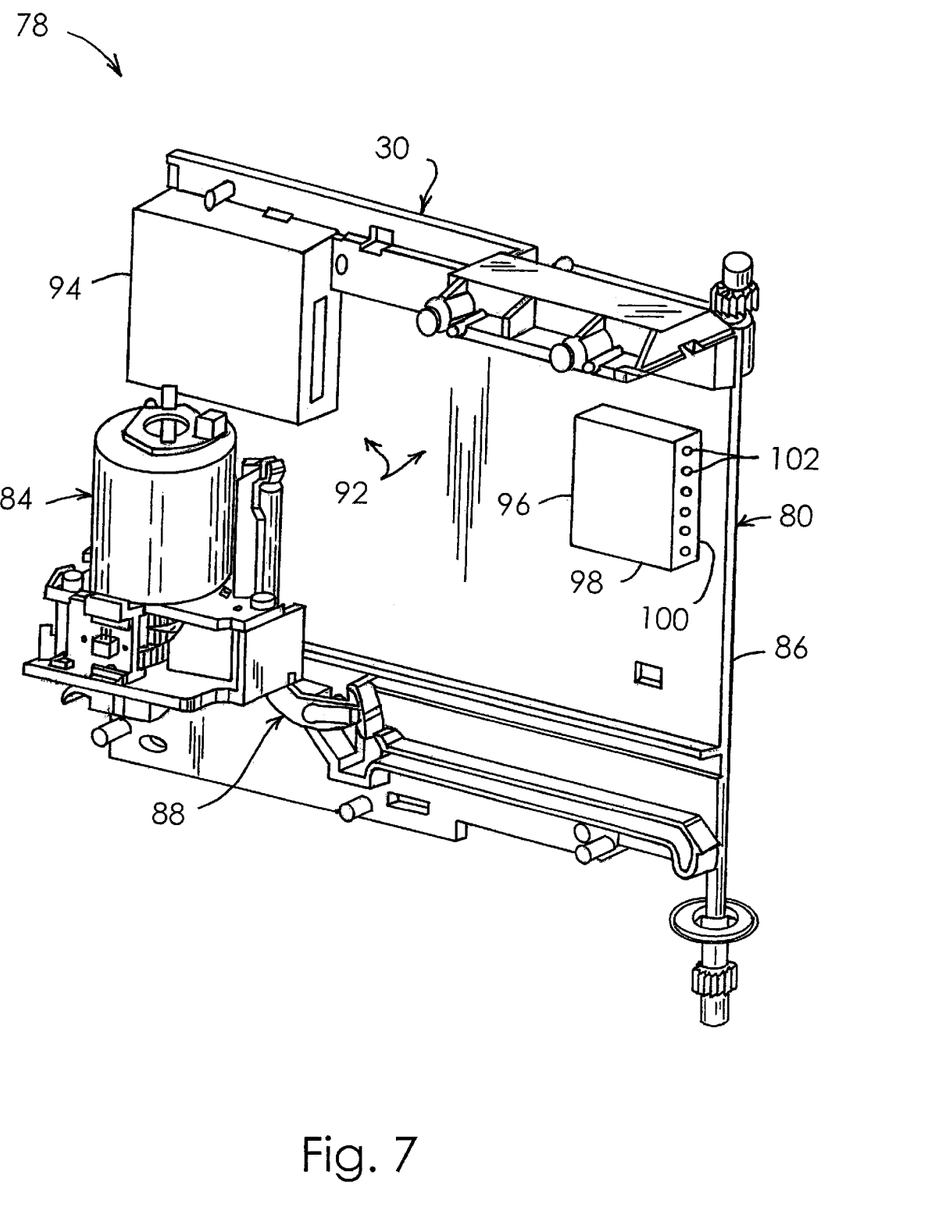
FIG. 7 is a perspective view of the cartridge access device shown in FIG. 6 with a side member removed to show the bar code reading device and the thumb and finger assemblies.

The cartridge access device 30 is best seen in FIG. 6 and may comprise a portion of the cartridge positioning system 28 which moves the cartridge access device 30 to various positions (e.g., 76, 76', 76") along the various cartridge receiving devices 32 so that the cartridge access device 30 may access the data cartridges 24 contained therein. To load and retrieve the data cartridges 24 into and from the various cartridge receiving devices 32, the cartridge access device 30 may also be provided with a cartridge engaging assembly or "picker" 78 (FIG. 7). The cartridge engaging assembly 78 contained within the cartridge access device 30 is adapted to engage a data cartridge 24 contained in a cartridge receiving device 32 and to draw the data cartridge 24 into the cartridge access device 30. The cartridge engaging assembly 78 is also adapted to load or insert the data cartridge 24 into a cartridge receiving device 32, e.g., either the cartridge magazines 34 or the cartridge read/write device 36, as the case may be. Stated simply, then, the cartridge engaging assembly 78 is used to retrieve data cartridges 24 from, and insert them into, the various cartridge receiving devices 32. The cartridge access device 30, which includes the cartridge engaging assembly 78, is used to transport the data cartridges 24 to desired locations within the data storage system 12.

Figure 8:
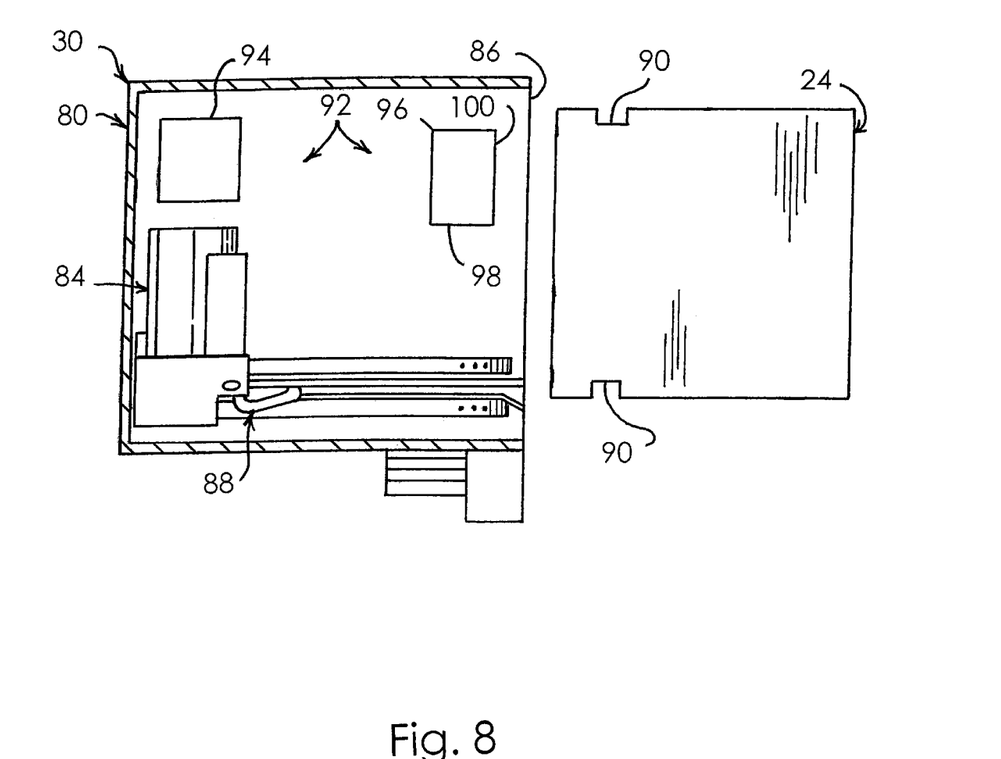
FIG. 8 is a simplified sectional view in elevation of the cartridge access device shown in FIG. 6 positioned adjacent a data cartridge.

Referring now to FIGS. 6 through 8, the cartridge engaging assembly 78 may include a frame assembly 80 that defines an interior chamber or cavity 82 sized to receive a data cartridge 24. A cartridge plunge mechanism or "thumb" assembly 84 may be slidably mounted to the frame assembly 80 so that the thumb assembly 84 may be moved toward and away from the cartridge access end 86 of frame assembly 80. The thumb assembly 84 may be provided with a finger assembly 88 configured to engage a notch 90 or other similar feature provided on the data cartridge 24. See FIG. 8. The finger assembly 88 allows the thumb assembly 84 to engage and withdraw the data cartridges 24 from the cartridge receiving devices 32.

Since the contents of and/or the arrangement of the data cartridges 24 within the data storage system 12 may change (e.g., data cartridges 24 may be moved, added, removed, or replaced) the data storage system 12 may be provided with an inventory system (not shown) for keeping track of the presence, locations and identities of the various data cartridges 24 stored within the data storage system 12. The inventory system may comprise any of a wide range of inventory systems now known in the art or that may be developed in the future. The inventory system may be internal to the data storage system 12, although such need not be the case.

As shown in FIG. 7, the inventory system of the data storage system 12 may include a bar code reading device 92. The bar code reading device 92 may be mounted to the cartridge access device 30 so that the bar code reading device 92 is moveable or positionable next to the data cartridges 24 at a position where it can read the bar code labels (not shown) on the data cartridges 24. The bar code reading device 92 may comprise a detector 94 and a light source 96. The light source 94 may be contained within a generally rectangularly shaped housing 98 having a transparent front surface 100 to allow the light source 96 contained therein (e.g., light emitting diodes 102) to illuminate the bar code labels which may be positioned on the data cartridges 24.

The bar code reading device 92 may assist in the creation of the inventory list. More specifically, the bar code reading device 92 may be positioned adjacent each of the data cartridges 24 within the various cartridge receiving devices 32 so that the bar code reading device 92 can read the bar code labels positioned on each of the data cartridges 24 contained therein. The bar code reading device 92 may detect indicia contained on the bar code labels and produce output signals related thereto. The output signals may be received by the data storage system 12 which creates an inventory list containing data pertaining to the presence, locations, and identities of the various data cartridges 24 within the data storage system 12. Alternatively, other methods of creating the inventory list are possible. For example, the system operator may create the inventory list by entering the identities and specific locations for the data cartridges 24 with an appropriate input device, such as a keyboard (not shown) of a host computer system (also not shown) to which the data storage system 12 may be connected.

Regardless of how it is created, the inventory list may be used by the control system of the data storage system 12 to locate one or more of the data cartridges 24 within the data storage system 12. That is, the control system may actuate the cartridge positioning system 28 so that the cartridge access device 30 is moved along the various cartridge receiving devices 32 (e.g., cartridge storage racks or magazines 34 or cartridge read/write devices 36) within the data storage system 12, until the cartridge access device 30 is positioned adjacent to where the desired data cartridge should be located within the data storage system 12 according to the inventory list.

The inventory list may be stored by the data storage system 12 so that it is preserved over one or more power cycles of the data storage system 12. In other words, the inventory list is maintained or preserved while the data storage system 12 undergoes the power cycle so that it may be subsequently used by the control system after the data storage system 12 has undergone the power cycle. Alternatively, the inventory list may be stored on a computer readable storage device (not shown) operatively associated with the host computer system to which the data storage system 12 may be connected.

Although the data storage system 12 may be connected to the host computer system, such is not required for the operation of the inventory control apparatus 10. That is, the inventory control apparatus 10 may be used in conjunction with an internal inventory control system of the data storage system 12 so that the operation of the inventory control apparatus 10 is not dependent on the host computer system. In other words, the inventory control apparatus 10 may be operable even when the host computer system is disconnected from the data storage system 12.

Assuming now that the host computer system is connected to the data storage system 12, the host computer system may access or store data on the data cartridges 24. For example, if certain data contained on a particular data cartridge is desired, the host computer system will issue commands to the control system of the data storage system 12. In response to those commands, the control system actuates the cartridge positioning system 28 which moves the cartridge access device 30 along the cartridge magazines 34 until it is positioned adjacent to where the desired data cartridge should be located according to the inventory list. The bar code reading device 92 may assist the control system in determining when the cartridge access device 30 has been positioned adjacent the desired data cartridge. In other words, the bar code reading device 92 reads the bar code label positioned on the data cartridge to verify whether the data cartridge is the desired data cartridge. If not, the cartridge access device 30 may be moved to another data cartridge. Once the desired data cartridge has been located, the cartridge engaging assembly 78 then removes the data cartridge from the cartridge magazine 34 and draws it into cartridge access device 30. The cartridge access device 30 then transports the data cartridge to the cartridge read/write device 36. The data cartridge is inserted into the cartridge read/write device 36 so that the host computer system may thereafter read data from or write data to the data cartridge. After the read/write operation is complete, the cartridge engaging assembly 78 removes the data cartridge from the cartridge read/write device 36 and draws it back into the cartridge access device 30 so that the data cartridge may be returned to its appropriate or inventoried location in the cartridge magazine 34.

Regardless of the particular type of data storage system 12 in which the inventory control apparatus 10 is used, the inventory control apparatus 10 according to the present invention may comprise a plurality of settings (e.g., first setting 18, second setting 20, or other settings). One of the settings (e.g., the first setting) may cause the data storage system 12 to inventory all of the data cartridges 24 and data cartridge storage locations within the data storage system 12 after the data storage system 12 has undergone a power cycle. Conversely, the second setting 20 may cause the data storage system 12 to not perform an inventory after the data storage system 12 has undergone a power cycle. Each of the plurality of settings for the inventory control apparatus 10 may be preserved for subsequent power cycles of the data storage system 12 until changed by a system operator. However, as described more fully below, it is generally preferred that the second or no inventory setting 20 be changed from the second setting 20 to the first setting 18 without any system operator intervention after the data storage system 12 has been rebooted without an inventory unless the system operator has elected to have the second setting 20 preserved over subsequent power cycles of the data storage system 12.

It should be noted that the term "power cycle" as used herein refers to the process of the data storage system 12 being shut down and then rebooted (i.e., a cold or hard boot) regardless of whether the data storage system 12 was shut down intentionally or unintentionally. For example, the data storage system 12 has undergone a "power cycle" after it has been shut down intentionally by the system operator and then rebooted. The data storage system 12 has also undergone a "power cycle", however, if it has been rebooted after an unintentional or accidental shut down (e.g., as a result of a power failure, a power surge, a system crash, the system operator accidentally unplugging the data storage system 12, etc.). Furthermore, the term "power cycle" also includes the process of restarting the data storage system 12 by performing a reset operation (i.e., a warm or soft boot). Consequently, the term "reboot" as used herein includes both cold and warm boots of the data storage system 12.

With reference now primarily to FIGS. 1 and 2, the inventory control apparatus 10 utilized in one preferred embodiment may be provided with the switch 16 that may be switched or moved between the first setting 18 (FIG. 1) and the second setting 20 (FIG. 2). The first setting 18 may cause the data storage system 12 to inventory all of the data cartridges 24 and data cartridge storage locations within the data storage system 12 after it has undergone a power cycle. The first setting 18 may also cause the data storage system 12 to modify the inventory list in accordance with the results of the inventory. In other words, if the contents of or the arrangement of the data cartridges 24 within the data storage system 12 has been changed (e.g., if a data cartridge 24 has been moved, added, removed, or replaced), the changes are incorporated into the inventory list. That is, the data storage system 12 modifies the inventory list so that the inventory list comprises data representative of the data cartridge storage locations (e.g., presence, locations and identities of data cartridges 24 therein) within the data storage system 12 after the power cycle. The data storage system 12 may later use the modified inventory list to locate one or more data cartridge 24. Alternatively, the first setting 18 may cause the data storage system 12 after it has performed the inventory to create a new inventory list, which may later be used by the data storage system 12 (e.g., when locating one or more data cartridge 24). As before with the modified list, the new inventory list would comprise data representative of the data cartridge storage locations (e.g., presence, locations and identities of data cartridges 24 therein) within the data storage system 12 after the power cycle.

As briefly mentioned earlier, the inventory control apparatus 10 may also be operable in one or more other settings. These other settings may each cause the data storage system 12 to inventory a particular portion, but not all, of the data cartridges 24 and data cartridge storage locations within the data storage system 12 after the data storage system 12 has undergone a power cycle. For example, one setting may cause the data storage system 12 to inventory only those data cartridges 24 and cartridge storage slots contained within the drawer 22. Another setting may cause the data storage system 12 to inventory only those data cartridges 24 and data cartridge storage locations that are not contained within the drawer 22. By providing the inventory control apparatus 10 with these other settings, the system operator may choose which portion, if any, of the data storage system 12 will be inventoried after the power cycle by selecting the appropriate setting.

The first setting 18 may be preserved over one or more power cycles of the data storage system 12 until changed by the system operator. In other words, the first setting 18 may be preserved for subsequent power cycles of the data storage system 12. Each time the data storage system 12 is rebooted, the system operator may be provided with the option of either changing the setting or continuing with the setting previously selected for the inventory control apparatus 10. Alternatively, the inventory control apparatus 10 may be changed from the first setting 18 to the second setting 20 without any system operator intervention upon completion of the inventory.

Referring now to FIG. 2, the inventory control apparatus 10 may also be operable in the second setting 20. When operated in the second setting 20, the inventory control apparatus 10 causes the data storage system 12 to not perform an inventory after the data storage system 12 has undergone a power cycle. The data storage system 12 may then use the inventory list that was created prior to the power cycle to locate one or more of the data cartridges 24 stored within the data storage system 12.

It is generally preferred, but not required, that the inventory control apparatus 10 be changed from the second setting 20 to the first setting 18 without any system operator intervention after the data storage system 12 has been rebooted without an inventory. It is also preferable, however, to provide the system operator with the option of having the second setting 20 preserved over one or more power cycles of the data storage system 12 until reset or changed by the system operator, although such is not required. If the second setting 20 is preserved over subsequent power cycles of the data storage system 12, the system operator may be provided after each reboot with the option of changing the setting or continuing with the previously selected setting for the inventory control apparatus 10. The option to preserve the second setting 20 over subsequent power cycles of the data storage system 12 may be password protected such that it may only be selected by the system operator after the system operator enters an appropriate password. In an alternative embodiment, the inventory control apparatus 10 may be operatively associated with the drawer 22 such that moving the drawer 22 causes the inventory control apparatus 10 to be in the first setting 18 without any system operator intervention. In other words, even though the system operator may have selected the second setting 20, the opening or closing of the drawer 22 causes the inventory control apparatus 10 of the alternative embodiment to be in the first setting 18 and thus causes the data storage system 12 to perform an inventory after the power cycle.

As mentioned earlier, the switch 16 may be used to allow the system operator to select between the first and second settings 18 and 20. The switch 16 may allow the system operator to make this selection before the data storage system 12 is shut down, while the data storage system 12 is shut down or rebooting, or even as late as after the data storage system 12 has been rebooted. The second setting 20, however, may be password protected such that the system operator may be required to enter an appropriate password before selecting the second setting 20.

The switch 16 may be operatively associated with the control panel 44 of the data storage system 12. More specifically, the control panel 44 may be provided with push buttons 16 that the system operator accesses or pushes to select between the first and second settings 18 and 20. See FIGS. 1 and 2. The control panel 44 may also include a means for identifying the first and second settings 18 and 20. For example, in the embodiment shown and described herein, the control panel 44 is provided with the display screen 19 that identifies which of the buttons 16 corresponds to the first (i.e., inventory) setting 18 and which of the buttons 16 corresponds to the second (i.e., no inventory) setting 20. If the inventory control apparatus 10 comprises settings (not shown) in addition to the first and second settings 18 and 20, the control panel 44 may be provided with additional push buttons (not shown) for allowing the system operator to select those other settings. As before with the first and second settings 18 and 20, the display screen 19 may be used to identify the setting that corresponds to each additional push button.

In an alternative embodiment, the switch (not shown) may be implemented as a user selectable interface (e.g., icon or dialog box) that is displayed on a computer display screen (also not shown) of the host computer system. Depending on the particular application, the user selectable interface may be displayed prior to the data storage system 12 being shut down, while the data storage system 12 is shut down or being rebooted, or even as late as after the data storage system 12 has been rebooted. Once displayed, the system operator can select between the first (i.e., inventory) option 18 and the second (i.e., no inventory) option 20 by simply marking the appropriate box on the computer display screen with an appropriate input or pointing device (e.g., mouse) associated with the host computer system. If the inventory control apparatus 10 comprises settings (not shown) in addition to the first and second settings 18 and 20, those other settings may also be listed in the user selectable interface that is displayed on the computer display screen. In any event, the setting once selected by the system operator may be preserved even after the host computer system is shut down. The system operator after rebooting the host computer system may, however, be provided with the option of changing the setting.

The host computer system may be programmed in accordance with any of a wide range of programming methods that are now known in the art or that may be developed in the future that will allow the host computer system to display the user selectable interface. That is, one having ordinary skill in the art could easily program the host computer system to display the user selectable interface after having become familiar with the teachings of the present invention. Accordingly, the details associated with programming the host computer system to display the user selectable interface will not be further discussed herein.

The inventory control apparatus 10 may further include a lock assembly or apparatus 46 operatively associated with the data storage system 12 to selectively lock or unlock a data cartridge access device (e.g., the drawer 22). That is, the lock assembly 46 may be used to prevent the system operator from accessing the data cartridges 24 or data cartridge storage locations within the data storage system 12 if the second (i.e., no inventory) option 20 is selected while the data storage system 12 is undergoing the power cycle. If the data storage system 12 is powered down during the power cycle, however, the lock assembly 46 may release the drawer 22 while the data storage system 12 is without power and may then relock the drawer 22 once power is restored to the data storage system 12. Alternatively, the lock assembly 46 may remain operational while the data storage system 12 is shut down and thus may be provided with its own power source (not shown) that is not dependent on whether the data storage system 12 is operational. In either case, the lock assembly 46 may also be used during the normal or regular course of operation of the data storage system 12.

In the embodiment shown and described herein, the lock assembly 46 is used to secure the drawer 22 in a fully closed or retracted position thereby securing the data cartridges 24 and data cartridge storage locations of drawer 22 inside the data storage system 12. The lock assembly 46 may be operatively associated with the inventory control apparatus 10 such that the second setting 20 causes the lock assembly 46 to secure or lock the drawer 22 in the closed position. With the drawer 22 securely closed, the system operator will not be able to access any of the data cartridges 24 or data cartridge storage locations within the drawer 22.

Figure 9:
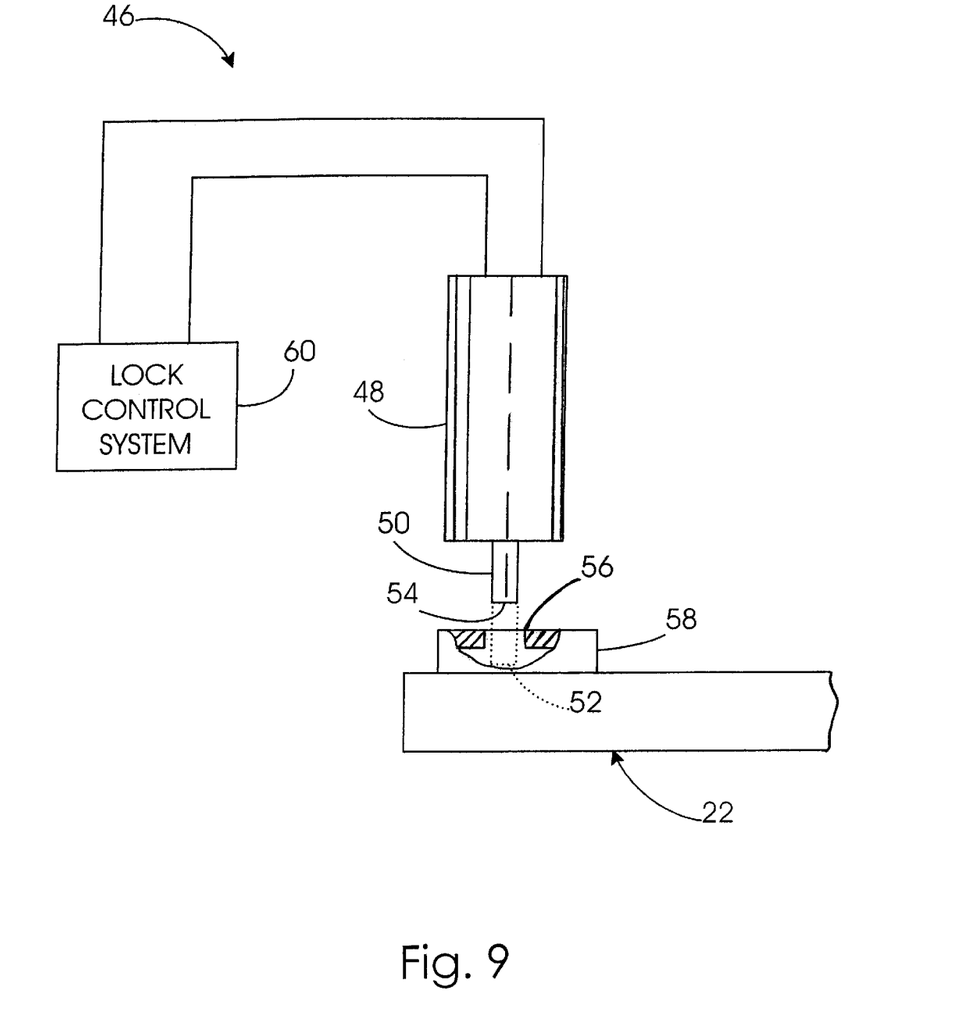
FIG. 9 is a side view in elevation of a lock assembly for locking a drawer of the data storage system in a retracted position.

Referring now to FIG. 9, the lock assembly 46 utilized in one preferred embodiment may comprise a lock actuator 48 for moving a lock bolt or plunger 50 between a locked position 52 and an unlocked position 54. A spring (not shown) may be used to bias the lock bolt 50 in the unlocked position 54. The lock bolt 50 may be sized to engage at least one aperture 56 provided in a lock plate 58 mounted on the drawer 22. A lock control system 60 may be provided that is operatively associated with the inventory control apparatus 10. The lock control system 60 may actuate the lock actuator 48 and thus lock the drawer 22 in the fully closed or retracted position when the inventory control apparatus 10 is in the second setting 20. The drawer 22 may also continue to be secured in the fully closed position by the lock assembly 46 even after the data storage system 12 has completed the power cycle. Thus, the lock control system 60 may also be responsive to the host computer system, the control system contained within the data storage system 12, and/or the system operator via the control panel 44 and may receive commands therefrom to actuate the lock actuator 48 and release the drawer 22.

The various components of the lock assembly 46 may comprise any of a wide range of devices and systems well-known in the art and that are readily commercially available. For example, the lock actuator 48 may comprise an electrically operated solenoid having a plunger 50 sized to engage the hole 56 provided in lock plate 58. In the embodiment shown and described herein, the lock bolt 50 is biased in the unlocked position 54 by a suitable spring. Consequently, energizing the solenoid will move the lock bolt 50 to the locked position 52 thus securing the drawer 22 in the fully closed or retracted position. Of course, other types of components and operating arrangements could also be used, as would be obvious to persons having ordinary skill in the art.

To carry out the functionality of the inventory control apparatus 10, the control and inventory systems (not shown) contained within the data storage system 12 may be operatively associated with the inventory control apparatus 10. If the system operator selected the first setting 18, the control system once the data storage system 12 has been rebooted may actuate the cartridge positioning system 26 to position the cartridge access device 30 adjacent each of the data cartridges 24 stored within the data storage system 12. In positioning the cartridge access device 30 adjacent each of the data cartridges 24, the bar code reading device 92 mounted to the cartridge access device 30 will also be positioned adjacent each of the data cartridges 24. The bar code reading device 92 may then detect indicia contained on the bar code labels positioned on the data cartridges 24 and produce output signals related thereto. The data storage system 12 may receive the output signals from the bar code reading device 92 and modify the inventory list, if necessary. The inventory list may then be stored by the data storage system 12 so that it will be preserved while the data storage system 12 is undergoing the power cycle. Conversely, if the system operator had selected the second setting 20, the control system once the data storage system 12 has undergone the power cycle may simply access the inventory list created prior to and maintained during the power cycle of the data storage system 12.

The inventory control apparatus 10 may be operated in accordance with a method 62 illustrated in FIG. 4 to allow the system operator to choose whether or not the data storage system 12 will inventory any of its data cartridge storage locations, such as the data cartridge storage locations within drawer 22, after the data storage system 12 undergoes a power cycle. In the first step 64 of method 62, the system operator selects or changes the setting 18 or 20 of the inventory control apparatus 10. For example, if the system operator wants the data storage system 12 to perform an inventory when the data storage system 12 is rebooted, the system operator would select the first setting 18 by pushing the appropriate button 16 on the control panel 44 of the data storage system 12. See FIG. 1. Alternatively, if the inventory control apparatus 10 was provided with other settings (not show, but described earlier) in addition to the first and second settings 18 and 20, the system operator may instead select the setting that causes the data storage system 12 to inventory a particular portion (e.g., the data cartridges 24 and data cartridge storage locations within drawer 22) of the data storage system 12 when the data storage system 12 is rebooted. Conversely, if the system operator wanted to reboot the data storage system 12 without an inventory, the system operator would select the second setting 20 by pushing the other button 16 on the control panel 44. See FIG. 2. In the second step 65, a determination is made as to whether the system operator selected the second setting 20. If it is determined that the system operator did select the second setting 20, the drawer 22 is locked in the fully closed position by the lock assembly 46 at step 66 so that the system operator is prevented from accessing the data cartridges 24 or data cartridge storage locations within the drawer 22. In the next step 67, the data storage system 12 undergoes the power cycle (e.g., the data storage system 12 is rebooted). If the data storage system 12 is powered down during the power cycle, the lock assembly 46 may release the drawer 22 while the data storage system 12 is without power and may then relock the drawer 22 once power is restored to the data storage system 12. At step 68, a determination is again made as to whether the system operator selected the second setting 20. If it is determined that the system operator did not select the second setting 20 (e.g., the system operator selected the first setting 18), the data storage system 12 performs an inventory at step 70 and then modifies the inventory list at step 72, if necessary (i.e., if the contents and/or data cartridge arrangement of the data storage system 12 has changed), in accordance with the results of the inventory. However, if it is determined that the system operator did select the second setting 20, the drawer 22 may be unlocked at step 73 but the data storage system 12 will not perform an inventory.

The method 62 may also comprise additional steps. For example, the method 62 may comprise the step (not shown) of prompting the system operator to either confirm or reverse the setting for the inventory control apparatus 10. This latter step may be inserted into the method 62, for example, between steps 64 and 65 or between steps 67 and 68.

It is contemplated that the inventive concepts herein described may be variously otherwise embodied and it is intended that the appended claims be construed to include alternative embodiments of the invention except insofar as limited by the prior art.

What is claimed is:

1. Inventory control apparatus for a data storage system, comprising: a switch operatively associated with said inventory control apparatus, said switch being operable by a system operator to allow the system operator to selectively operate said inventory control apparatus in a first setting and a second setting, the first setting causing said data storage system to inventory a data cartridge storage location of said data storage system after said data storage system has undergone a power cycle; the second setting causing said data storage system to not perform an inventory after said data storage system has undergone the power cycle.

2. The inventory control apparatus of claim 1, wherein said first setting further causes said data storage system to modify an inventory list having data therein representative of said data cartridge storage location in accordance with said inventory, the inventory list being created prior to and being preserved over said power cycle.

3. The inventory control apparatus of claim 1, wherein said first setting further causes said data storage system to create an inventory list, the inventory list having data therein representative of said data cartridge storage location.

4. The inventory control apparatus of claim 1, wherein said first setting is preserved for subsequent power cycles of said data storage system until changed by a system operator.

5. The inventory control apparatus of claim 1, wherein said second setting is preserved for subsequent power cycles of said data storage system until changed by the system operator.

6. The inventory control apparatus of claim 1, wherein said inventory control apparatus is caused to be in said first setting after said data storage system has undergone said power cycle while in said second setting.

7. The inventory control apparatus of claim 1, wherein said switch is operatively associated with a control panel of said data storage system, said system operator accessing the control panel to select between said first setting and said second setting.

8. The inventory control apparatus of claim 1, further comprising a lock assembly operatively associated with said data storage system and said inventory control apparatus, the lock assembly being usable to secure said data cartridge storage location of said data storage system within said data storage system while said data storage system undergoes said power cycle, the lock assembly securing said data cartridge storage location within said data storage system when said inventory control apparatus is in said second setting.

9. The inventory control apparatus of claim 8, wherein said lock assembly comprises:

a lock actuator operatively associated with said data storage system;

a lock bolt operatively associated with said lock actuator, said lock actuator moving said lock bolt between a locked position and an unlocked position; and a lock plate having an aperture therein sized to receive said lock bolt.

10. The inventory control apparatus of claim 8, wherein said data cartridge storage location is defined by a drawer of said data storage system, and wherein said lock assembly secures the drawer in a retracted position when said inventory control apparatus is in said second setting.

11. The inventory control apparatus of claim 1, wherein said switch allows the system operator to selectively operate said inventory control apparatus in a third setting, the third setting causing said data storage system to inventory a second data cartridge storage location of said data storage system after said data storage system has undergone said power cycle.

12. An inventory control method for use in a data storage system, comprising:

providing inventory control apparatus operatively associated with said data storage system, the inventory control apparatus being operable in a first setting and a second setting, the first setting causing said data storage system to inventory a data cartridge storage location of said data storage system after said data storage system has undergone a power cycle, the second setting causing said data storage system to not perform an inventory after said data storage system has undergone the power cycle;

selecting the first setting so that said data storage system inventories the data cartridge storage location after said data storage system has undergone the power cycle, or, in the alternative;

selecting the second setting so that said data storage system does not perform an inventory after said data storage system has undergone the power cycle.

13. The method of claim 12, further comprising when said second setting is selected, securing said data cartridge storage location within said data storage system.

* * * * *